US009589293B1

(12) United States Patent
Yalamanchi

(10) Patent No.: US 9,589,293 B1
(45) Date of Patent: Mar. 7, 2017

(54) CATALOGING ITEMS AND RELATIONSHIPS BETWEEN ITEMS

(71) Applicant: Amazon Technologies, Inc., Reno, NV (US)

(72) Inventor: Aravind Yalamanchi, Lynnwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/222,523

(22) Filed: Mar. 21, 2014

(51) Int. Cl.
*G06Q 30/00* (2012.01)
*G06Q 30/06* (2012.01)

(52) U.S. Cl.
CPC ..... *G06Q 30/0625* (2013.01); *G06Q 30/0603* (2013.01); *G06Q 30/0641* (2013.01)

(58) Field of Classification Search
CPC ........ G06Q 30/0631; G06Q 30/0601–30/0645
USPC ................................................. 705/26.1–27.2
See application file for complete search history.

(56) References Cited

U.S. PATENT DOCUMENTS 8,185,446 B1 * 5/2012 Kuznetsova ....... G06Q 30/0601
705/26.1
8,290,818 B1 * 10/2012 Levitan .............. G06Q 30/0631
705/26.7
2005/0228788 A1 * 10/2005 Dahn .................. G06F 17/3066
2012/0203675 A1 * 8/2012 Hassan .............. G06Q 30/0226
705/27.2
2012/0259687 A1 * 10/2012 Kajamohideen ... G06Q 30/0601
705/14.23

OTHER PUBLICATIONS

E Rapti, A Karageorgos, G Ntalos, "Adaptive Constraint and Rule-Based Product Bundling in Enterprise Networks", 2014 IEEE 23rd International WETICE Conference, 15-20.*

* cited by examiner

*Primary Examiner* — Resha Desai
*Assistant Examiner* — Lindsey Smith
(74) *Attorney, Agent, or Firm* — Kilpatrick Townsend & Stockton LLP

(57) ABSTRACT

Techniques for cataloging items and relationships between items may be provided. For example, a computing service may be implemented to generate a description of an item and to determine a relationship between the item and another item. In addition to cataloging the description of the item, the computing service may also catalog the relationship. For example, the catalog service may generate a catalog page that may include a number of fields. Some of the fields may be used to capture the description of the item, while other fields may be used to identify the other item and a relationship type. Further, in response to a search for the item, the catalog service may return information about the item and, based on the cataloged relationship, information about the other item.

22 Claims, 11 Drawing Sheets

CATALOGING ITEMS AND RELATIONSHIPS BETWEEN ITEMS

BACKGROUND

An electronic marketplace may be configured to enable merchants to provide items to consumers. The merchants may offer a wide range of items at various prices, conditions, and purchasing options. A consumer may access the electronic marketplace to browse for an item and may compare offers from a number of merchants. For example, the electronic marketplace may provide the consumer with a list of merchants offering the item, prices that the item may be offered at, and available delivery methods. In turn, the consumer may select an offer from the list to obtain the item. Further, the electronic marketplace may facilitate a transaction between the consumer and the merchant corresponding to the selected offer. However, as the number of merchants and items increases and, subsequently, the number of offers increases, the consumer may face challenges.

BRIEF DESCRIPTION OF THE DRAWINGS

Various embodiments in accordance with the present disclosure will be described with reference to the drawings, in which.

DETAILED DESCRIPTION

Figure 1:
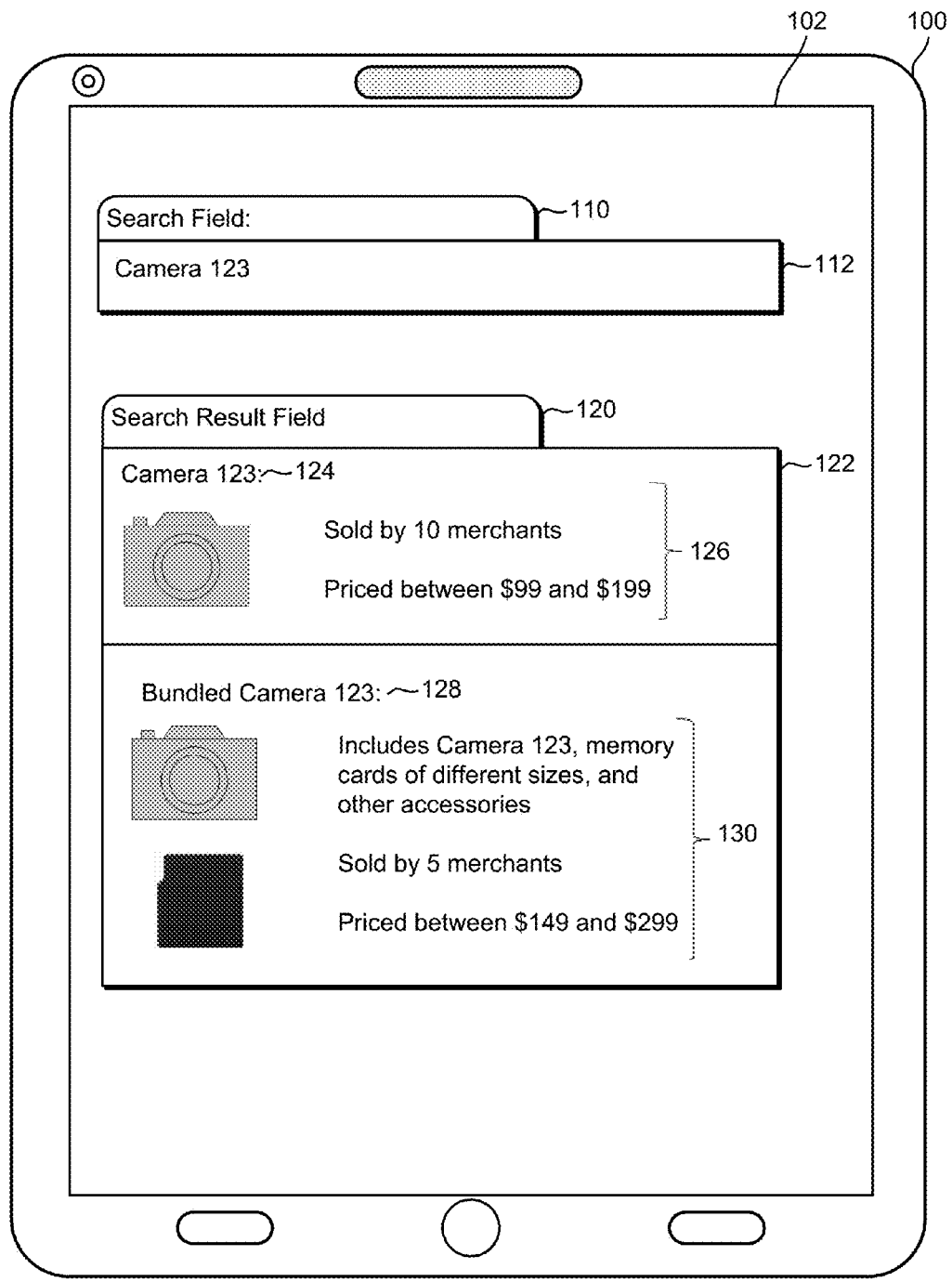
FIG. 1 illustrates an example computing device for displaying offers to a consumer, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing consumer experience by, for example, providing consumers with additional information to allow informed decisions when viewing/ordering items. For example, in an electronic marketplace, merchants may desire to offer items not only on a per item basis, but also on a bundled basis. In a bundle, the merchants may group items and may offer the bundle at a discounted price. To enable such offers, a service provider of the electronic marketplace may provide a catalog for defining the items and the bundles and aspects of the offers. Pages of the catalog may correspond to the items and the bundle. To avoid the impact of data fragmentation associated with data distributed in various pages as further discussed herein below, the service provider may also catalog relationships between the items and the bundle. For instance, the service provider may configure the corresponding page of the bundle to identify which of the bundled items may be a primary item and to identify the relationships between the primary item and the other items in the bundle. Further, the service provider may link the pages of the catalog based on the relationships. As such, when a consumer searches for an item in the bundle, the electronic marketplace may, based on the catalog, provide information about that item and information about the bundle. Because the pages may be linked, the electronic marketplace may further provide an option for navigating between the pages. As such, the consumer may view, for example, the page of the searched item and the page of the bundle and may compare the associated offers.

To illustrate, Toni may be a camera enthusiast looking to purchase a camera. Jesse may be a merchant offering the camera and related accessories, such as a memory card, a tri-pod, and a case at the electronic marketplace. Jesse may offer each of the items individually and in a bundle. In turn, the service provider may set-up separate pages in the catalog, one for each item and one for the bundle, and may link the pages to indicate the bundling relationship. In response to a search request from Toni and based on the catalog, the electronic marketplace may return a search result listing multiple options for purchasing the camera and the associated prices, including an option for purchasing the camera individually and another option for purchasing the camera with the bundled accessories. Noticing that the bundled camera may be cheaper and finding the accessories interesting, Toni may request further information about the bundled option. In turn, the electronic marketplace may provide Toni with data from the corresponding pages of the catalog. For example, the data may include descriptions of the bundle, the camera, and the accessories and price comparisons for each item if purchased individually and if purchased part of the bundle.

In the interest of clarity of explanation, the embodiments are described in the context of an electronic marketplace, service providers, items, merchants, and consumers. Nevertheless, the embodiments may be applied to any network-based resource (e.g., a web site), any item that may be tangible (e.g., a product) or intangible (e.g., a service), any service provider (e.g., a provider of a network-based resource, or a provider that may facilitate providing of an item), any merchant (e.g., an item provider, a seller, or any user offering an item at the electronic marketplace), and any consumer (e.g., an item recipient, a buyer, or any user reviewing, ordering, obtaining, purchasing, or returning an item).

Also in the interest of clarity of explanation, the embodiments are described using various examples of related items such as bundled items, generic items, universal part items, and replacement part items. Nevertheless, the embodiments may be applied to other items and other relationships between items. More generally, a family of items may refer to two or more items that may be related by a certain relationship. A parent item of the family may refer to one of the items. In comparison, a member item of the family may be an item of the family other than the parent item. In an example, the parent item may be an item that the member items may be related to and that, without the parent item, relationships may not necessarily exist between the member items. Further, various types of member items may exist. For example, a member item may be a child item, where the child item may directly depend from the parent item. In turn, the child item may be a parent to another member item. Similarly, a member item may be a sibling item to the child item if the sibling item also depends from the parent item. To illustrate, in a bundle, the primary item of the bundle may be a parent item, while the remaining items may be members of the bundle. Further, one or more of the member items may be a bundle(s) of another set of items. For example, in a camera bundle, the camera may be the parent item, while the remaining items may include two bundles: one for electronic accessories such as a memory card and a battery and one for non-electronic accessories such as a camera case and a tri-pod.

Which item may be a parent item and which item may be a member may depend on a type of the relationship between the items. For example, in a bundle, a parent item may include the primary item around which the bundle may be built. To illustrate, in an offer for a camera package that may include a camera, a memory card, a tri-pod, a case, and/or other accessories, the camera may be the primary item (e.g., the parent item) while the remaining accessories may be member items. In another example, in an offer for generic items, a parent item may include a base item from which the generic items may be derived. To illustrate, a generic version of a vitamin supplement may be a member item, while the original version may be a parent item. Similarly, an original equipment manufacturer (OEM) cell phone charger may be a parent item, while other non-OEM but otherwise similar cell phone chargers may be member items. In yet another example, in an offer for a universal part item, the universal part item may be a member item and an item that may accept the universal part item may be a parent item. To illustrate, a universal vacuum bag may be the member item, while a vacuum cleaner accepting the bag may be the parent item. In a further example, in an offer for a replacement part item, the replacement part item may be a member item and the item that may install the replacement part item may be a parent item. To illustrate, tires for a car may be member items, while the car may be the parent item.

Further, the embodiments may implement a catalog service for providing functions and features, as described herein, to a service provider of an electronic marketplace, merchants, and consumers. For example, the catalog service may use various techniques for determining relationships and types of relationships between items. Once determined, the catalog service may document the relationships in a data structure such as a catalog or other examples of data models. For example, a catalog may include pages, where each page may correspond to an item or to a family of items. A page for a family of items may be referred to herein as a family page, while a page for an item may be referred to herein as an item page. The family page may describe various items of the family and various aspects of offering the items as a family. In comparison, an item page may describe the corresponding item and various aspects of offering the item independently of the family. Further, the family page and/or the item pages may include identifiers of the relationship and the relationship types. These identifiers may allow the catalog service to link the various pages of the catalog. Once the pages are linked, the catalog service may augment the consumer experience based on the data structure. For example, a search engine may interact with the catalog service and may use the data structure to not only return information about one item, but to also return information about the family and other items in the family. Similarly, a rendering engine may display not only information about one item, but also options to navigate between information corresponding to the various linked pages. These and other features are described in the next figures.

Turning to FIG. 1, that figure illustrates an example computing device 100 that may be configured to allow a consumer to browse items. More particularly, the consumer may operate the computing device 100 to perform various interactions with an electronic marketplace, such as to search, browse, and obtain an item. The electronic marketplace may implement a catalog service, similar to the one described herein above. In response to a consumer interaction, the electronic marketplace may cause the computing device 100 to present information about the item and the merchants, including corresponding offers based on a catalog. The catalog may include pages describing the item, a family of items containing the item, and relationships between the various items and the family. To facilitate the consumer interactions, the computing device 100 may be configured to provide a user interface 102 that may use touch screen and other technologies.

The user interface 102 may include one or more windows that may display outputs of and may allow inputs to one or more processes. A web browser is an example of such processes and may be configured to present various types of information such as a search field 110 and search result field 120. For example, the computing device 100 may execute the browser and connect to the electronic marketplace to retrieve and display the information on the user interface 102. This information may include search results based on a match between search criteria inputted at the search field 110 and descriptions of items from the catalog of the electronic marketplace. It should be apparent to a person of ordinary skill in the art that other processes may be used such as, for example, a programmable application interface (API). Also, it should be apparent to a person of ordinary skill in the art that, although FIG. 1 illustrates the information as being simultaneously displayed in a same window of the user interface 102, this simultaneous presentation may not be necessary. Instead, some of the information may be presented in separate windows of the user interface 102.

The search field 110 may allow the consumer to input a search criterion 112, such as a title (e.g., "camera 123" as shown in FIG. 1), a universal product code (UPC), a unique identification number, an attribute of the item (e.g., camera with a certain megapixel resolution), and/or other search criteria. In turn, the computing device 100 may transmit data corresponding to the search criterion 112 to the electronic marketplace. In response, a search engine of the electronic marketplace may interact with the catalog service to query the catalog for matching items based on the received data. Search results of the query may be transmitted back to the computing device 100 with instructions for rendering the search results.

The computing device 100 may render the search results at the user interface 102 under the search result field 120. In an example, a rendering engine of the computing device 100, such as a web browser engine, may parse the received instructions to render the search results. As shown in FIG. 1, a list 122 may be used for the rendering. However other formats or techniques for presenting the search results may be used and should be apparent to one of ordinary skill in the art in light of the embodiments described herein. The list 122 may include several fields, where each field may correspond to a category of search results. For example, the list 122 may present information specific to the searched item in a first field and information specific to a family that may contain the item in a second field. The first field may present various offer aspects for obtaining the item on an individual basis. In comparison, the second field may present various offer aspects for obtaining the item part of a family of items. In an example, the various aspects may summarize information about the offers such as by identifying the item or the family of items, a number of merchants associated with the offers, and associated price ranges.

Figure 2:
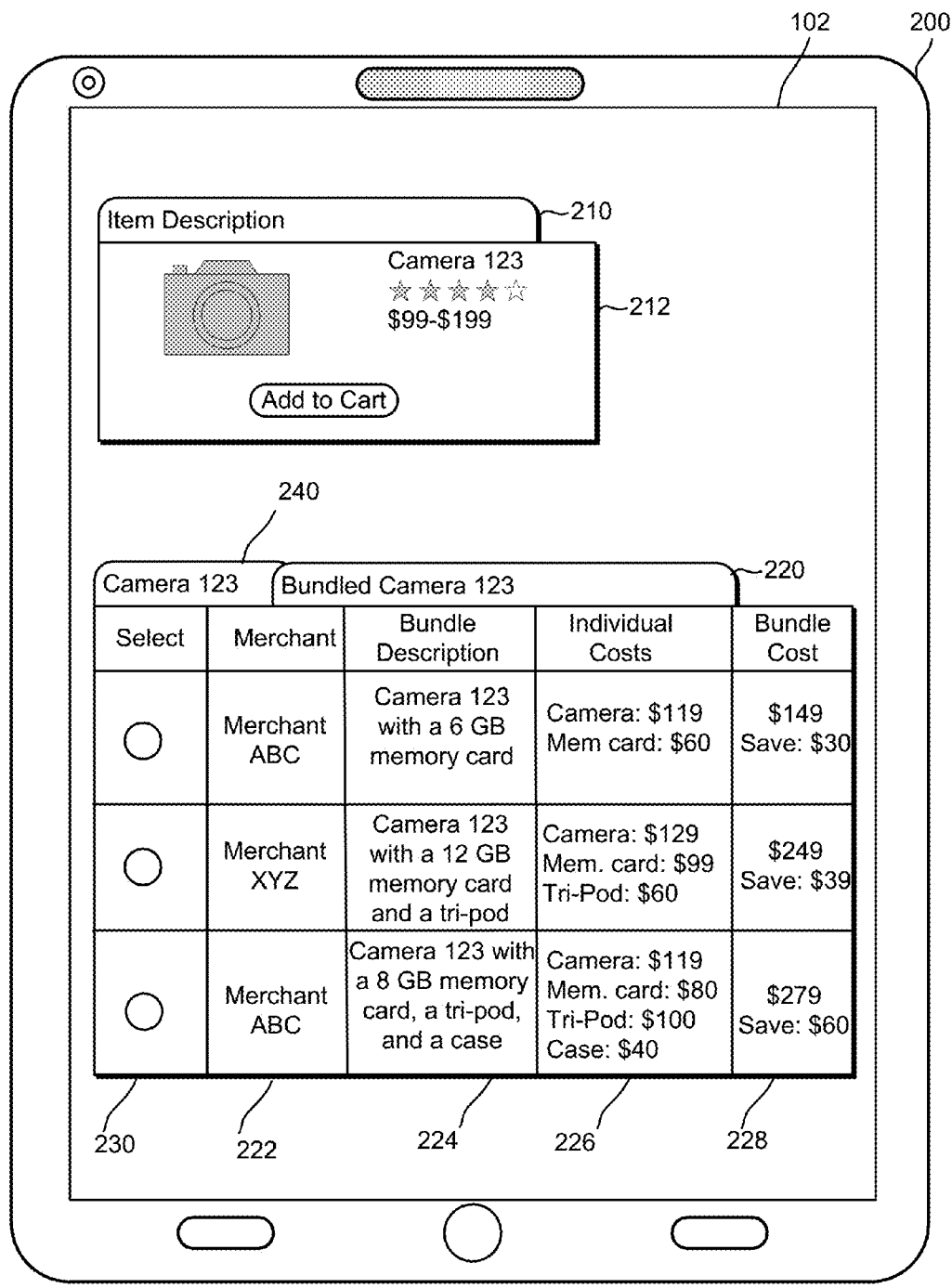
FIG. 2 illustrates another example computing device for displaying offers to a consumer, according to embodiments.

Furthermore, the list 122 may be configured to allow the consumer to navigate to information pages (e.g., web pages) that may further describe the search results. The information pages may be populated based on the catalog. For example, the first field may include a link that, when activated, may cause the computing device 100 to refresh the user interface 102 to display information page about the item. The second field may also include a similar link that may cause a display of an information page about the family. An example information page is illustrated in FIG. 2. In an example, a link may include a hyperlink or some other link associated with a universal record locator (URL) or some other locator of a web page of the electronic marketplace. The catalog service may populate the content of the web page from descriptions found in corresponding pages of the catalog.

As illustrated in FIG. 1, the consumer may input "camera 123" for the search criterion 112. In response, the computing device 100 may present search results in the list 122 corresponding to cameras and bundles described in the catalog and matching the criterion 112. For example, in the first field, the list 122 may show a title 124 corresponding to a matched camera (e.g., "camera 123" as shown in FIG. 1) and a description 126 of various merchants offering the camera and an associated price range. In the second field, the list 122 may also show a title 128 corresponding to a bundle containing the camera (e.g., "bundled camera 123" as shown in FIG. 1) and a description 130 related to the bundle. The description 130 may identify what items the bundle may contain (e.g., camera 123, memory cards, and other accessories as shown in FIG. 1) and summarize how many merchants may offer the bundle and an associated price range. Other information retrieved from the catalog may be also presented in the list 122. For example, the description 130 may identify a price range of the camera if bought in the bundle and a saving range related to the prices of the camera between the two types of offers. Upon an activation of the first field (e.g., by clicking on the title 124 or the description 126), the user interface 102 may render an information page (e.g., a web page) about the camera. Similarly, upon an activation of the second field (e.g., by clicking on the title 128 or the description 130), the user interface 102 may render an information page about the bundle. Although FIG. 1 illustrates an example of a family (e.g., a bundle of items), other types of families may be similarly presented at the user interface 102, such as families of generic items, universal part items, and replacement part items. Further, although a list 122 is illustrated in FIG. 1, other formats for presenting the information may be used. For example, tabs, tiles, and other formats may be used.

Hence, by operating the computing device 100 to interact with the electronic marketplace, the consumer may not only receive information about an item, but may also receive information about a family containing the item. The information may be summarized in a list or some other format to allow the consumer to view a comparison between various offer types for obtaining the item, such as offers to purchase the item individually and offers to purchase the family.

Turning to FIG. 2, that figure illustrates an example information page describing various aspects of offering an item. The example information page may be displayed in response to activating a field from the list 122 of FIG. 1. Alternatively, the example information page may be displayed independently of the list 122. For instance, in response to searching for an item as described in FIG. 1, data for the example information page and associated rendering instructions may be provided from the electronic marketplace to the computing device 100. In other words, the example information page may be displayed at the user interface 102 in lieu of the list 122.

As illustrated in FIG. 2, the example information page presented at the user interface 102 may include a combination of any of an item description 210, a family tab 220, and/or an item tab 240. Generally, the item description 210 may describe an item, such as an item found based on search criteria. The family tab 210 may present information about various offers for a family containing the item. In comparison, the item tab 240 may present information about various offers for the item itself independent of the family. These and other fields may be configured to augment the consumer experience by providing sufficient information for an informed decision. For example, the fields may be configured to compare, across multiple merchants, offers for an item to offers for families containing the item. The information associated with the fields may be received from the electronic marketplace. For example, the web browser of the computing device 100 may interact with the catalog service of the electronic marketplace, where the catalog service may retrieve corresponding descriptions from the pages of the catalog and populate a web page accordingly to form the example information page.

More particularly, the item description 210 may include various descriptions 212 of the item, such as an image or a graphic representation, a descriptive text, and a price range of the item. This information may be retrieved from a catalog page specific to the item. In comparison, the family tab 220 may include family-related information, such as information about selectable offers for families containing the item. This information may be retrieved from catalog pages specific to the families and/or catalog pages specific to the items in the families. For example, the family tab 220 may list the various merchants 222, various families 224 that the merchants 222 may offer, individual costs 226 of the items per family, and costs 228 of the families. Also, the family tab 220 may provide select fields 230 to allow a consumer selection of one of the offers. The merchants 222 may identify a merchant offering a family (e.g., merchant ABC). The families 224 may identify items in the family (e.g., camera 123 with a 6 GB memory card). The individual costs 226 may identify the price of an item in a family if purchased independently of the family. The costs 226 may identify the price of a family and the price saved if the family is purchased rather than purchasing the items on an individual basis. Other fields may be also listed under the family tab 220 and should be apparent to one of ordinary skill in the art in light of the embodiments herein. As explained herein above, these and other fields may be configured to compare various offers related to the item. Further, the item tab 240 may list similar information as the information of the family tab 220, except that the various fields may relate to offering the item independently of a family.

Additionally, the various fields of the example information page may be linked to allow navigation between the fields and/or additional information pages. For example, by activating (e.g., clicking) the item tab 240, the user interface 102 may be refreshed to list the various offers for the item in lieu of the offers for the families. Similarly, by activating the descriptions 212 of the item, the user interface 102 may be refreshed to render a new information page specific to the item. In comparison, by activating one of the families 224 fields, the user interface 102 may be refreshed to render a new information page specific to the corresponding family. The navigation between the information pages may be based on how the corresponding pages in the catalog may be linked. For example, the catalog service may generate a web page and may populate the content of the web page from descriptions found in corresponding pages of the catalog. Further, the catalog service may link web pages based on how the corresponding pages of the catalog may be linked.

As illustrated in FIG. 2, in response to a search for a camera 123, the user interface 102 may display a description of the camera 123 under the item description 210, a summary of offers for obtaining the camera 123 in a bundle under the family tab 220, and a summary of offers for obtaining the camera 123 on an individual basis under the family tab 220. The consumer may view not only offers from multiple merchants, but also price comparisons between the offers and price comparisons for obtaining the camera with or without accessories grouped therewith in bundles. Although FIG. 2 illustrates example families (e.g., bundles of items), other types of families may be similarly presented at the user interface 102, such as families of generic items, universal part items, and replacement part items. Further, although a tab format is illustrated in FIG. 2, other formats for presenting the information may be used. For example, lists, tiles, and other formats may be used.

As explained herein above, the service provider of the electronic marketplace may implement the catalog service to catalog items and relationships between items offered by merchants. The catalog service may generate information pages, such as web pages, by retrieving information from the catalog and may provide user devices with access to the information pages.

Figure 3:
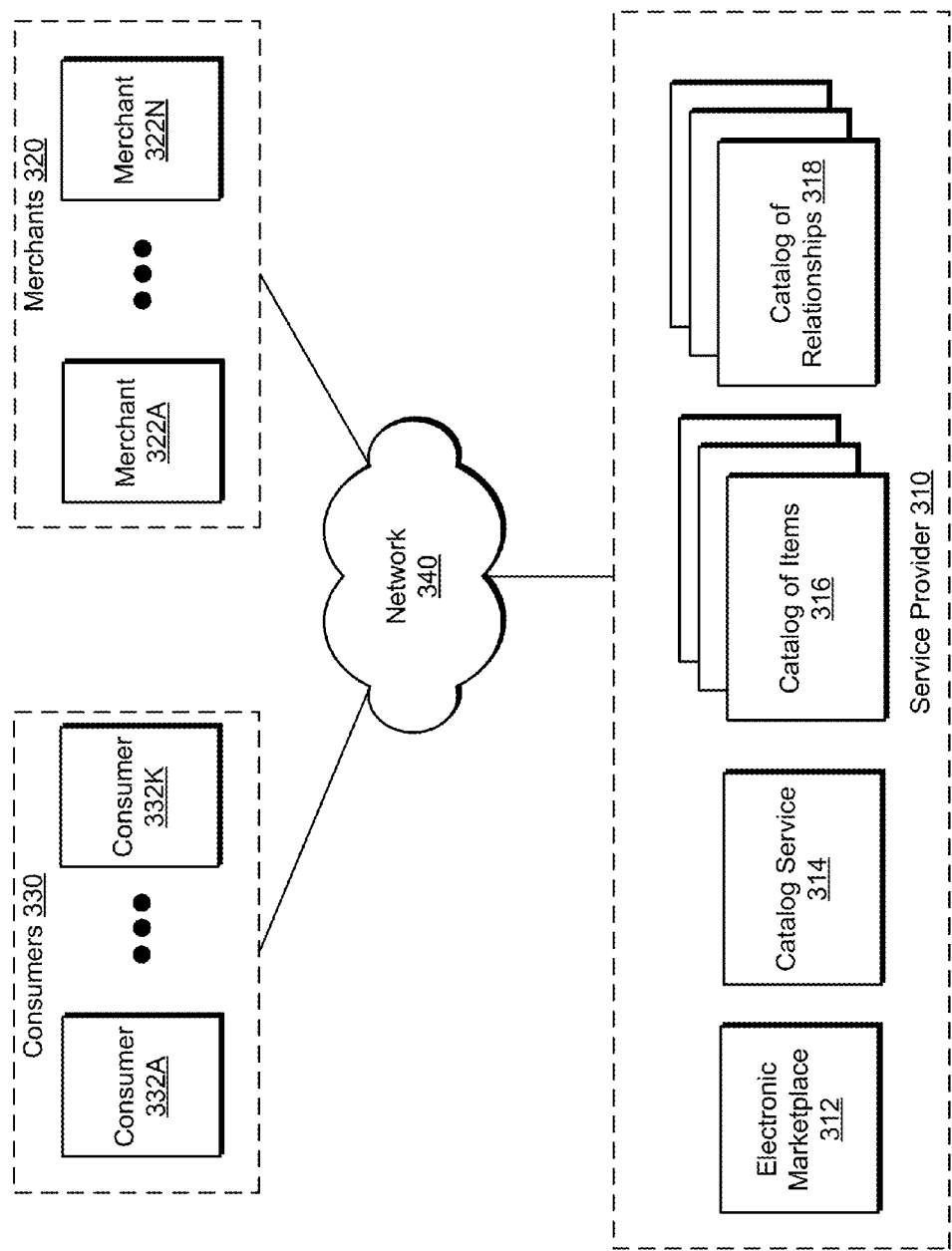
FIG. 3 illustrates another example computing environment for offering items, according to embodiments.

Turning to FIG. 3, that figure illustrates an example computing environment for implementing the catalog service to provide user devices with access to information pages about items and families of items. In particular, the illustrated computing environment may be configured to allow a service provider 310 of an electronic marketplace 312 to implement a catalog service 314, similar to the one described herein above. The catalog service 314 may catalog items offered by merchants 320 at the electronic marketplace 312 and relationships between the items and may allow consumers 330 to browse and search for the items.

More particularly, the service provider 310, the merchants 320, and the consumers 330 may operate various types of computing devices to connect over a network 340. The service provider 310 may configure the electronic marketplace 312 to provide various functions and features to the merchants 320 and consumers 330, including for example, allowing the merchants 320 to offer items at the electronic marketplace 312 and the consumers 330 to review and obtain the items from the merchants 320 by way of the electronic marketplace 312.

As shown, there may be a large number of merchants 322A-322N. Each of these merchants may offer various items. The items may be offered not only at various prices, but also with various contexts. These contexts may include, for example, offering items on an individual basis or grouped in families of items. Various types of families may exist, such as bundles, generic, universal part, and replacement part families. Similarly, various relationship types may exist between members of a family, such as parent, member, child, sibling, and exclusive relationships.

There may also be a large number of consumers 332A-332K. Each of these consumers may browse, search, and/or order various items from the merchants 322A-322N under various contexts. For example, one consumer may search for a particular item from a particular merchant, while another consumer may search for another item from all available merchants. Similarly, one consumer may be interested in an item on an individual basis, while another consumer may be interested in a family of items. In yet another example, one consumer may search for an item by describing attributes of the item in a search query, while another consumer may search for the item by using the associated UPC. In a further example, the consumers 330 may follow certain behavioral pattern when looking for an item at the electronic marketplace 312. For example, certain number of consumers may look first for a particular item, add the item to a shopping cart, and subsequently add another item to the cart. This behavior may indicate a relationship between the two items and the sequence of adding the two items to the cart may indicate a relationship type. For example, the particular item may be a parent item, while the other item may be a child item. The service provider 310 may track the usage history of the consumers 330 and may analyze the usage history to determine the behavioral pattern.

The service provider 310 may configure the electronic marketplace 312 to facilitate various transactions between any of the merchants 320 and any of the consumers 330. A transaction involving an item may include searching for, browsing, obtaining, purchasing, providing, delivering, returning the item, leaving consumer reviews, and/or other item-related transactions.

Further, the service provider 310 may implement the catalog service 314 to facilitate aspects of the transactions. For example, the catalog service 314 may provide interfaces usable by the merchants 320 to define offers for items and relationships between offered items. The catalog service 314 may also receive merchant-related contexts and consumer-related contexts. Based on the various information received from the merchants 330, the catalog service 314 may generate a catalog of items 316 and a catalog of relationships 318 between the items. In an example, the catalog of items 316 may include catalog pages, where the catalog pages may correspond to items or to families of items. A catalog page for an item may include various fields describing the item. Similarly, a catalog page for a family of items may include various fields describing items of the family. Also in an example, the catalog of relationships 318 may include relationship pages, where the relationship pages may correspond to items or to families of items and may describe relationships and relationship types. Although FIG. 3 illustrates the catalog of relationships 318 as being separate from the catalog of items 316, the two catalogs may be integrated. For example, the relationships between items of a family and, subsequently, between catalog pages may be identified in fields of the catalog pages of the catalog of items 316 as further described in the next figures. The next figures also describe example processes for determining the relationships and generating the catalog of items 316 and the catalog of relationships 318.

Additionally, the catalog service 314 may provide interfaces usable by the consumers 330 to search for, browse, and conduct transactions involving items or families of items. For example, an interface may allow a consumer operate a computing device to input search criteria, view search results, navigate between information pages, and conduct a transaction as described in FIGS. 1 and 2. The catalog service 314 may interface with or implement a search engine that may search the catalog of items 316 and the catalog of relationships 318 to find items and families of items in response to the search criteria. Also, the catalog service 314 may generate the information pages, such as web pages, out of the catalog pages and the relationship pages and may interact with a rendering engine, such as a web browser engine, of the consumer's computing device to render the information pages.

The service provider 310 may implement an extensible design for various aspects of the cataloging service such that searches, catalog pages, relationship pages, information pages, and associated lists of offers may be configured through declarative mappings. For example, rather than hard-coding the various catalog pages and relationship pages, the service provider 310 may extend these components. To do so, the service provider 310 may define a field for a relationship type without explicitly declaring the value of the field. Similarly, the service provider 310 may define other fields for catalog pages and relationship pages without hard-coding the respective values. As such, new relationships may be declared and new catalog and relationship pages may be added by inputting the respective values without modifying the underlying code. As a result, the search engine may search and find new items and relationships and the catalog service 314 may generate new information pages that may include new relationships. To illustrate, if the catalog of items 316 and the catalog of relationships 318 initially contained bundled items only, to subsequently offer generic items, it may be sufficient to input the corresponding values in fields of the catalog of items 316 and the catalog of relationships 318. In turn, search results may include the generic items and a presentation of the search results may include a new tab specific to the generic items.

Hence, by leveraging a data structure that may catalog items, families of items, and relationships between the items, the service provider 310 may augment the consumer and merchant experience. On one hand, the consumers 330 may not only find items, but also families of items and may compare the associated offers. On the other hand, the merchants 320 may offer items in families and the associated offers may be intelligently presented to the consumers 330. Further, as described herein below, the data structure may help avoiding data fragmentation. For example, instead of having catalog pages as entities that may be separate and independent of each other, linking the catalog pages through relationships may allow data across the catalog pages to be cross-correlated and referenced.

Figure 4:
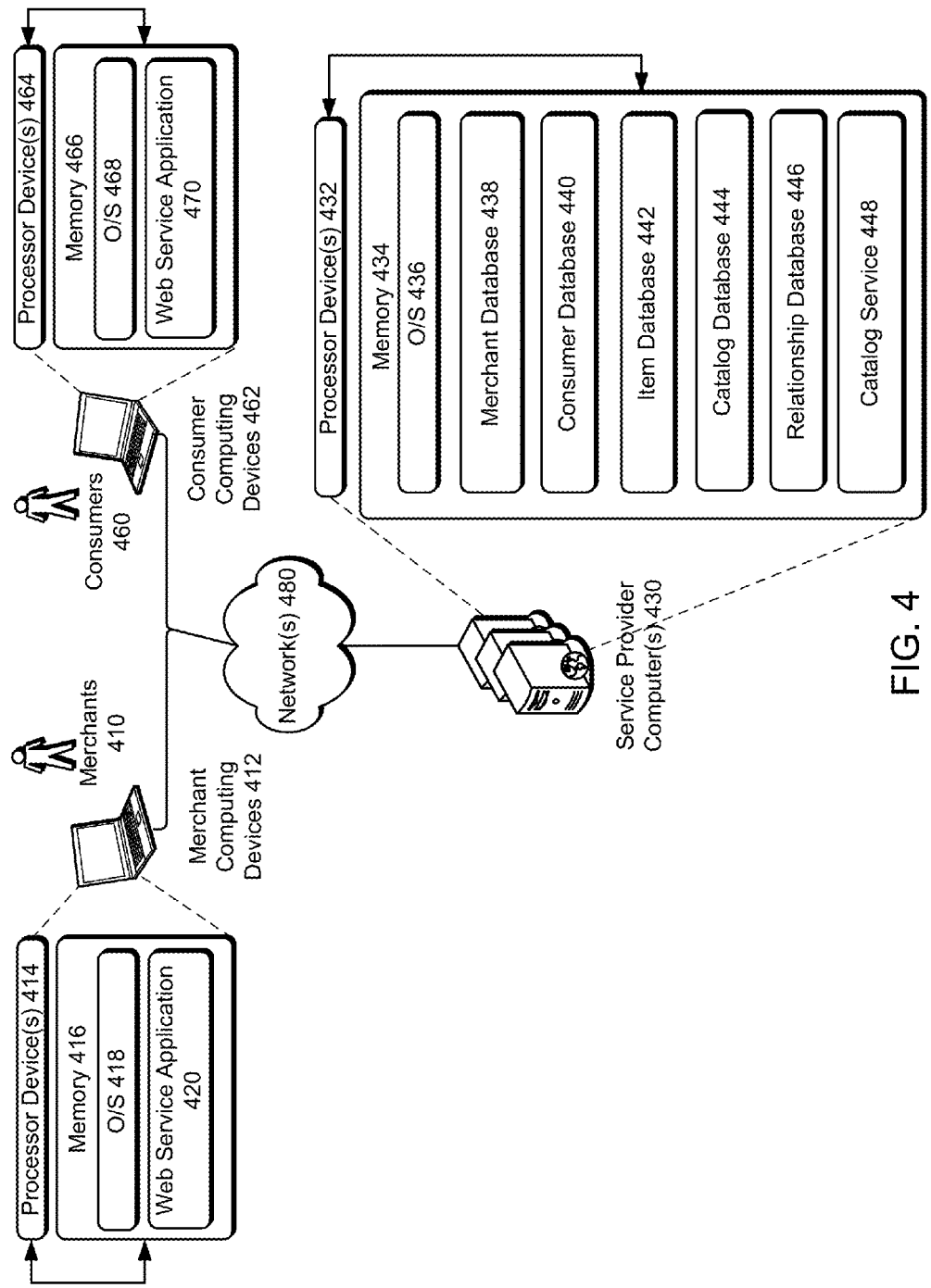
FIG. 4 illustrates an example architecture for offering items, including at least one user device and/or one or more service provider computers connected via one or more networks according to embodiments.

Turning to FIG. 4, that figure illustrates an example end-to-end computing environment for cataloging and offering items and families of items. In this example, a service provider may implement a catalog service, such as the catalog service 314 of FIG. 3, part of an electronic marketplace available to users, such as the merchants 320 and the consumers 330 of FIG. 3.

In a basic configuration, merchants 410 may utilize merchant computing devices 412 to access local applications, a web service application 420, merchant accounts accessible through the web service application 420, or a web site or any other network-based resources via one or more networks 480. In some aspects, the web service application 420, the web site, or the merchant accounts may be hosted, managed, or otherwise provided by one or more computing resources of the service provider, such as by utilizing one or more service provider computers 430. The merchants 410 may use the local applications or the web service application 420 to interact with the network-based resources of the service provider. These interactions may include, for example, offering items for sale and supporting transactions with consumers.

In some examples, the merchant computing devices 412 may be any type of computing devices such as, but not limited to, a mobile phone, a smart phone, a personal digital assistant (PDA), a laptop computer, a thin-client device, a tablet PC, etc. In one illustrative configuration, the merchant computing devices 412 may contain communications connection(s) that allow merchant computing devices 412 to communicate with a stored database, another computing device or server, merchant terminals, or other devices on the networks 480. The merchant computing devices 412 may also include input/output (I/O) device(s) or ports, such as for enabling connection with a keyboard, a mouse, a pen, a voice input device, a touch input device, a display, speakers, a printer, etc.

The merchant computing devices 412 may also include at least one or more processing units (or processor device(s)) 414 and one memory 416. The processor device(s) 414 may be implemented as appropriate in hardware, computer-executable instructions, firmware, or combinations thereof. Computer-executable instruction or firmware implementations of the processor device(s) 414 may include computer-executable or machine-executable instructions written in any suitable programming language to perform the various functions described.

The memory 416 may store program instructions that are loadable and executable on the processor device(s) 414, as well as data generated during the execution of these programs. Depending on the configuration and type of merchant the computing devices 412, the memory 416 may be volatile (such as random access memory (RAM)) or non-volatile (such as read-only memory (ROM), flash memory, etc.). The merchant computing devices 412 may also include additional storage, which may include removable storage or non-removable storage. The additional storage may include, but is not limited to, magnetic storage, optical disks, or tape storage. The disk drives and their associated computer-readable media may provide non-volatile storage of computer-readable instructions, data structures, program modules, and other data for the computing devices. In some implementations, the memory 416 may include multiple different types of memory, such as static random access memory (SRAM), dynamic random access memory (DRAM), or ROM.

Turning to the contents of the memory 416 in more detail, the memory may include an operating system (O/S) 418 and the one or more application programs or services for implementing the features disclosed herein including the web service application 420. In some examples, the merchant computing devices 412 may be in communication with the service provider computers 430 via the networks 480, or via other network connections. The networks 480 may include any one or a combination of many different types of networks, such as cable networks, the Internet, wireless networks, cellular networks, and other private or public networks. While the illustrated example represents the merchants 410 accessing the web service application 420 over the networks 480, the described techniques may equally apply in instances where the merchants 410 interact with the service provider computers 430 via the merchant computing devices 412 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, consumers 460 may utilize consumer computing devices 462 to access local applications, a web service application 470, consumer accounts accessible through the web service application 470, or a web site or any other network-based resources via the networks 480. In some aspects, the web service application 470, the web site, or the user accounts may be hosted, managed, or otherwise provided by the service provider computers 430 and may be similar to the web service application 420, the web site accessed by the computing device 412, or the merchant accounts, respectively. The consumers 460 may use the local applications or the web service application 470 to conduct transactions with the network-based resources of the service provider. These transactions may include, for example, searching for and purchasing items from the merchants 410.

In some examples, the consumer computing devices 462 may be configured similarly to the merchant computing devices 412 and may include at least one or more processing units (or processor device(s)) 464 and one memory 466. The processor device(s) 464 may be implemented as appropriate in hardware, computer-executable instructions, firmware, or combinations thereof similarly to the processor device(s) 414. Likewise, the memory 466 may also be configured similarly to the memory 416 and may store program instructions that are loadable and executable on the processor device(s) 464, as well as data generated during the execution of these programs. For example, the memory 466 may include an operating system (O/S) 468 and the one or more application programs or services for implementing the features disclosed herein including the web service application 470.

As described briefly above, the web service applications 420 and 470 may allow the merchants 410 and consumers 460, respectively, to interact with the service provider computers 430 to conduct transactions involving items. The service provider computers 430, perhaps arranged in a cluster of servers or as a server farm, may host the web service applications 420 and 470. These servers may be configured to host a web site (or combination of web sites) viewable via the computing devices 412 and 462. Other server architectures may also be used to host the web service applications 420 and 470. The web service applications 420 and 470 may be capable of handling requests from many merchants 410 and consumers 460, respectively, and serving, in response, various interfaces that can be rendered at the computing devices 412 and 462 such as, but not limited to, a web site. The web service applications 420 and 470 can interact with any type of web site that supports interaction, social networking sites, electronic retailers, informational sites, blog sites, search engine sites, news and entertainment sites, and so forth. As discussed above, the described techniques can similarly be implemented outside of the web service applications 420 and 470, such as with other applications running on the computing devices 412 and 462, respectively.

The service provider computers 430 may, in some examples, provide network-based resources such as, but not limited to, applications for purchase or download, web sites, web hosting, client entities, data storage, data access, management, virtualization, etc. The service provider computers 430 may also be operable to provide web hosting, computer application development, or implementation platforms, or combinations of the foregoing to the merchants 410 and consumers 460.

The service provider computers 430 may be any type of computing device such as, but not limited to, a mobile phone, a smart phone, a personal digital assistant (PDA), a laptop computer, a desktop computer, a server computer, a thin-client device, a tablet PC, etc. The service provider computers 430 may also contain communications connection(s) that allow service provider computers 430 to communicate with a stored database, other computing devices or server, merchant terminals, or other devices on the network 480. The service provider computers 430 may also include input/output (I/O) device(s) or ports, such as for enabling connection with a keyboard, a mouse, a pen, a voice input device, a touch input device, a display, speakers, a printer, etc.

Additionally, in some embodiments, the service provider computers 430 may be executed by one more virtual machines implemented in a hosted computing environment. The hosted computing environment may include one or more rapidly provisioned and released network-based resources, which network-based resources may include computing, networking, or storage devices. A hosted computing environment may also be referred to as a cloud computing environment. In some examples, the service provider computers 430 may be in communication with the computing devices 412 and 462 via the networks 480, or via other network connections. The service provider computers 430 may include one or more servers, perhaps arranged in a cluster, or as individual servers not associated with one another.

In one illustrative configuration, the service provider computers 430 may include at least one or more processing units (or processor devices(s)) 432 and one memory 434. The processor device(s) 432 may be implemented as appropriate in hardware, computer-executable instructions, firmware, or combinations thereof. Computer-executable instruction or firmware implementations of the processor device(s) 432 may include computer-executable or machine-executable instructions written in any suitable programming language to perform the various functions described.

The memory 434 may store program instructions that are loadable and executable on the processor device(s) 432, as well as data generated during the execution of these programs. Depending on the configuration and type of the service provider computers 430, the memory 434 may be volatile (such as random access memory (RAM)) or non-volatile (such as read-only memory (ROM), flash memory, etc.). The service provider computers 430 may also include additional removable storage or non-removable storage including, but not limited to, magnetic storage, optical disks, or tape storage. The disk drives and their associated computer-readable media may provide non-volatile storage of computer-readable instructions, data structures, program modules, and other data for the computing devices. In some implementations, the memory 434 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 434 in more detail, the memory may include an operating system (O/S) 436, a merchant database 438 for storing information about the merchants 410, a consumer database 440 for storing information about the consumers 460, an item database 442 for storing information about items and families of items offered by the merchants 410, a catalog database 444 for cataloging the items and the families of items, a relationship database 446 for cataloging relationships between the items and the families of items, and a catalog service 448.

The service provider may configure the catalog service 448 to categorize items and families of items and associated relationships and to provide corresponding information to the consumers 460, similarly to the catalog service 314 of FIG. 3. The catalog service 448 may interface with any of the databases 438-446 for providing these functions. Although FIG. 4 illustrates the databases 438-446 as stored in the memory 434, these databases or information from these databases may be additionally or alternatively stored at a storage device remotely accessible to the service provider computers 430. Configurations and operations of the catalog service 448 are further described in greater detail below with reference to at least FIGS. 5-10.

Figure 5:
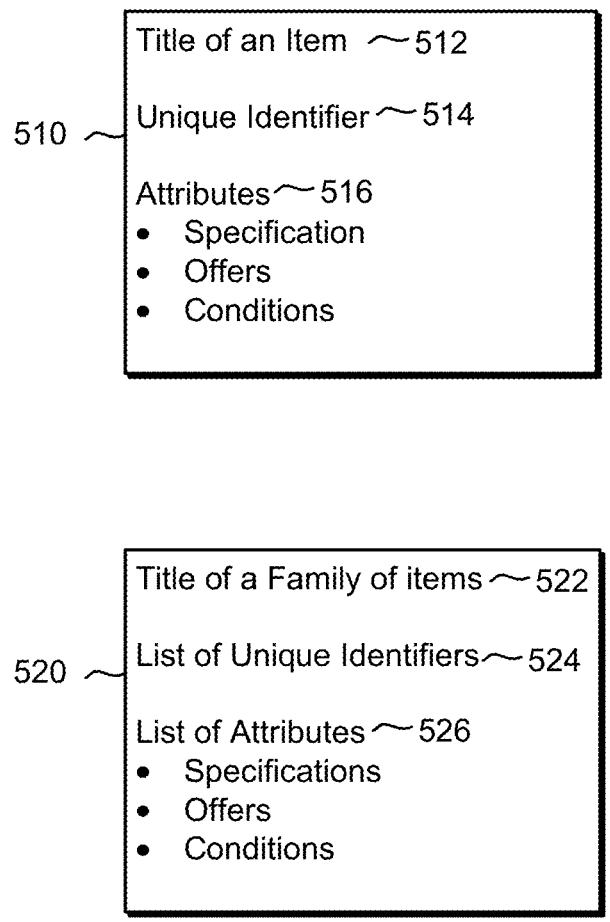
FIG. 5 illustrates an example data structure for offering items, according to embodiments.
Figure 6:
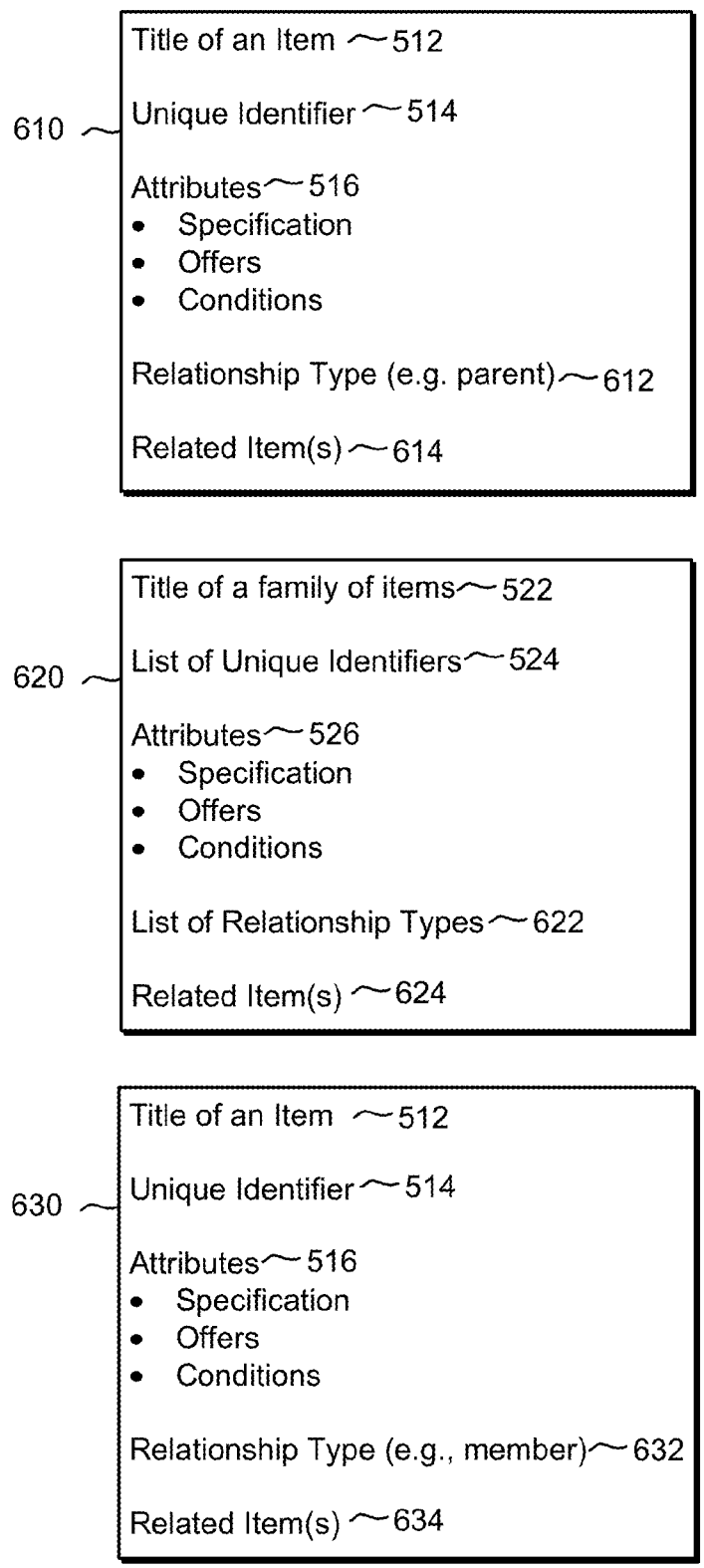
FIG. 6 illustrates another example data structure for offering items, according to embodiments.

More particularly, FIGS. 5-6 illustrate example catalog pages that the categorization service 448 may configure to catalog the items, families, and relationships. In comparison, FIGS. 7-10 illustrate example flows for determining the relationships, generating catalog and relationship pages, and providing information based on these pages to consumers.

Turning to FIG. 5, that figure illustrates examples of catalog pages. As shown, there may be a catalog page associated with an item. This catalog page may be referred to herein as an item page 510. Also as shown, there may be a catalog page associated with a family of items. This catalog page may be referred to herein as a family page 520.

As illustrated, the item page 510 may include several fields describing the item. For example, there may be a title field 512, a unique identifier field 514, an attributes field 516, and/or other fields. The title field 512 may include a title of the item (e.g., "camera 123"). The unique identifier field 514 may include an identifier that may uniquely identify the item. An example identifier may include a universal product code (UPC). A UPC may not only be unique to the electronic marketplace, but also across other marketplaces and may be obtained from a UPC issuing entity. Another example identifier may include an identification number that may be unique to the electronic marketplace. This identification number may be obtained from the service provider. Yet another example identifier may include a serial number that may be obtained from a manufacturer of the item. The attributes field 516 may describe various aspects of the item, such as a specification, technical features, uses, directions of uses, warnings, and/or other aspects of the item. In some embodiments, the attributes field 516 may also include various aspects of offering the item at the electronic marketplace, such as price, delivery methods, return policies, conditions, available color options, and/or other offer aspects.

In comparison, the family page 520 may also include several fields that may be similar to some extent. For example, there may also be a title field 522, a unique identifier field 524, an attributes field 526, and/or other fields. The title field 522 may similarly include a title of the family (e.g., "bundled camera 123"). In comparison, the attributes field 526 may similarly describe various aspects of the items in the family (e.g., a list of the attributes of the items) and of offers for the family. However, because the family may include bundled items, a generic item, a universal part item, or a replacement part item, the family may not have unique identifiers. For example, although each item in a bundle may have a unique identifier, the bundle itself may not have one. This may be because a merchant may not desire to obtain a UPC to avoid the corresponding expense. This may also be because the service provider may not assign an identification number as the potential number of bundles may be too large (e.g., the number of combination of "N" items may be N! and, thus, there may be (N−1)! bundles). Similarly, a generic item may not have a unique identifier although the corresponding base item (e.g., the parent item) may have a unique identifier. This may also be the case for a universal part item and for a replacement part item. As such, the unique identifier field 524 may either be empty, populated with a unique identifier of a parent item (rather than an identifier unique to the family), or, in the case of a bundle, may include a list of the unique identifiers corresponding to the items of the bundle.

Figure 8:
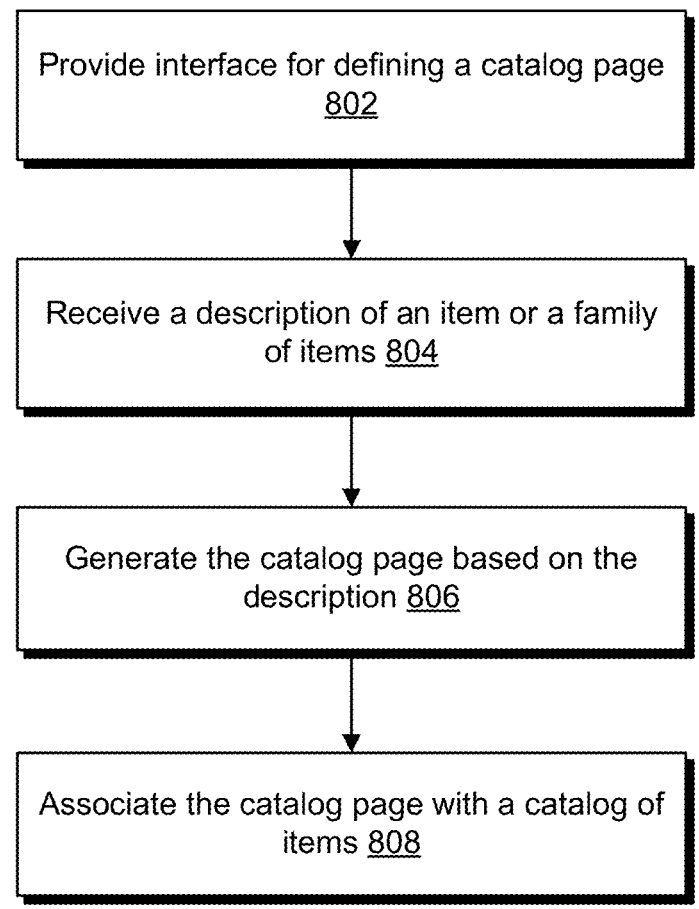
FIG. 8 illustrates an example flow for generating a data structure, according to embodiments.

An example flow for generating the catalog pages, including populating the respective fields, is further illustrated in FIG. 8. Briefly, various techniques may be used. In one technique, a service provider may generate the item page 510 such that there may be a single catalog page for the item regardless of how many merchants may be offering the item. In turn, each merchant may use an instance of this single page for offering the item according to a certain offer (e.g., price, condition, color attribute, or other aspects of the offer). In another technique, a merchant may generate the item page 510 rather that the service provider. In this case, for an item, there may be a plurality of item pages, each item page corresponding to an offer from a merchant. Similar techniques may also be used for the family page 520, where the service provider or a merchant may generate this page.

Further, to improve the quality of the information and to cope with the potential number of families, in an embodiment, the service provider may generate the item page 510, while a merchant may generate the family page 520. For example, because a parent item may have a unique identifier regardless of how many corresponding merchant offers may exist, by generating the corresponding item page 510, the service provider may ensure that the same description of the parent item (e.g., the title 512, the unique identifier 516, and the attributes 516) may be used by all merchants. This may reduce the likelihood of confusing consumers browsing offers for that parent item. In comparison, because each merchant may uniquely bundle items or generate a family of items, there may be a large number of families. Also, because families may not have unique identifiers, the service provider may not be able to properly identify similar families. Thus, in situations of families of items, enabling the merchants to generate family pages may allow flexibility to cope with the large number of families and with the lack of unique identifiers.

Regardless of the technique used to generate the catalog pages, data fragmentation may occur because the catalog pages may not be linked together based on corresponding relationships between the items. Data fragmentation may occur on an item page level and on a family page level. On the item page level, because there may be, for an item, multiple instances of an item page (e.g., when the service provider generates a corresponding single item page) or multiple item pages (e.g., when merchants generate the item pages), data across the instances or the item pages may not be cross-referenced or correlated. For example, any slight modification to an instance (e.g., a typographical error in the title) may render that instance different from the other instances. In this situation, when a consumer searches for the item, the search result may either not show the modified instance or, if shown, the modified instance may be listed as a different search result than the other instances. In another example, consumer reviews left in association with one of the instances or one of the item pages may not be propagated to the other instances or the item pages. In this situation, although a consumer may have commented on "camera 123" purchased from a particular merchant, the provided comments may not be shared across offers for "camera 123" from other merchants.

Data fragmentation on the family page level may be even more pronounced. For example, consumer reviews left for a family may not be propagated to the parent and/or member items of the family. Likewise, consumer reviews left for the parent or member items may not be propagated to the family. As such, a consumer review of "camera 123" may not be reflected in a bundle that may contain the camera. Similarly, a consumer review left for the bundle but specific to "camera 123" may not be propagated to the camera.

To overcome data fragmentation, the service provider may implement various techniques. In one technique, the service provider may use unique identifiers found in the catalog pages, rather than titles and/or descriptions, to serve request from consumers. To do so, the service provider may use a matrix or a table that maps each catalog page or instance of a catalog page to the corresponding unique identifier and may use the table to cross-correlate the data across the instances or catalog pages. For example, when a consumer searches for a camera by inputting the title, the table may be used to convert the title to a UPC. This UPC may be used to search through catalog pages and/or instances and to return the corresponding search results. For example, the returned search results may be shown on a user interface as a single result (e.g., in a same field of a list of fields) and, when that single result is activated, the user interface may be refreshed to list the search results in more details (e.g., each search result may be shown in a separate field). Similarly, a consumer review left about the camera can be propagated to the various catalog pages and/or instances using the UPC. Although this technique may be effective for an item, it may not necessarily be always applicable to a family of items because, as explained above, unlike the item, the family may not have a unique identifier. In another technique, the service provider may catalog relationships, as further described in FIG. 6. This technique may be effective for both an item and a family of items.

Turning to FIG. 6, that figure illustrates examples of cataloging not only items and families of items, but also relationships between the items. There may be a number of catalog pages, such as an item page 610, a family page 620, and another item page 630. The item pages 610 and 630 may be similar to the item page 510 of FIG. 5, except to reflect relationships as further described herein next. Likewise, the family page 620 may be similar to the family page 520 of FIG. 5, except to reflect relationships.

As illustrated, the catalog pages may be extended to include fields usable for defining the relationships. For example, a first field for identifying a relationship type and a second field for identifying related items may be used. In an example, for an item page, the first field may specify whether the item associated with the item page may be a parent, member, child, or a sibling item. Further, the first field may identify whether the item may be offered exclusively of other items. For a family page, the first field may list the various types of relationships between the items in the family. In another example, the second field may describe the related items and families. This description may use unique identifiers of the items, when available, titles of the items, titles of the families, and/or other descriptions of the related items and families.

To illustrate, consider the example of a camera and a memory card that may be bundled together. In the bundle, the camera may be a parent item while the memory card may be a member item. In this illustration, the item page 610 may correspond to the camera, the item page 630 may correspond to the memory card, and the family page 620 may correspond to the bundle. The first field 612 of the item page 610 may indicate that the camera may be a parent item. In comparison, the second field 614 of the item page 610 may indicate that the camera may be related to the bundle (e.g., by using the title 522 of the bundle) and the memory card (e.g., by using the title 512 and/or the unique identifier 514 of the memory card). This can be also done at the item page 630 of the memory card. For example, the first field 632 of the item page 630 may indicate that the memory card may be a member item, while the second field 634 of the item page 630 may identify the camera and the bundle as being related. In comparison, the first field 622 of the family page 620 may indicate that the family may be a bundle that may contain a parent item and a member item. Similarly, the second field 624 of the family page 620 may identify the camera and the memory card as being related.

Although two fields per catalog page are illustrated, a different number of fields, additional sub-fields, or combination of fields may be used. For example, in the family page 620, there may be, for each item in the family, a relationship type field and an associated related item field. Continuing with the previous illustration, in this example, there may be a total of four fields: a field identifying the camera, a field identifying that the camera may be a parent item, a field identifying the memory card, and a field identifying that the memory card may be a member item. These fields may also be combined. For example, there may be one field for identifying the camera and that the camera may be a parent item. Similarly, for the item page 610, there may be additional fields identifying other families that the camera may belong to and the associated relationship type. For example, if the camera is offered in a second bundle as an accessory, there may be an additional field identifying the second bundle and an additional field identifying that the camera may be a member of this second bundle.

Further, although the various relationship type fields (e.g., the first fields 612, 622, and 632) and related item fields (e.g., the second fields 614, 624, and 634) are illustrated as used in conjunction, such a use may not be necessary. In other words, it may be sufficient to list a relationship type field and a related item field in one of the catalog pages to catalog the relationships and, thus, to cross-correlate data and avoid data fragmentation. In an example, the family page 620 may include the first field 622 and the second field 624, while the item pages 610 and 630 may not include the first fields 612, 632 and the second fields 614, 634.

However, by extending the relationship type and related items fields to the various catalog pages, data corruption may be avoided and data quality may be improved. For example, by including the first field and second field 612 and 614 in the item page 610 and by including the first field and second field 622 and 624 in the family page 620, the service provider may detect an improperly defined relationship if such a relationship is not be properly referenced in both pages. In other words, inconsistencies between pages may indicate improper relationships. This may be the case when the service provider generates the item pages and when the merchants generate the family pages. To illustrate, if a merchant generates the item page 620 and identifies the camera item as a parent, and if the item page 610 does not reflect this relationship, the service provider may determine that the relationship may be improper and may take a corrective action. For example, the service provider may contact the merchant or may use certain analytics internal to the electronic marketplace to validate the relationship and update the item page 610 accordingly.

Additionally, although FIG. 6 illustrates that the relationships may be cataloged in the catalog pages, other techniques may be used to catalog the relationships. For example, and as illustrated in FIG. 3, the relationships may be defined in a catalog of relationships separate from the catalog of items. The two catalogs may be cross-referenced. In an example, the catalog of relationships may use unique identifiers, titles, descriptions, or other keys to reference items and families of items from the catalog of items.

FIGS. 7-10 illustrate example flows that can be implemented for cataloging items, families of items, and relationships associated therewith as described above in FIGS. 1-6. In the interest of clarity of explanation, a catalog service, such as the catalog service 448 of FIG. 4, is described in FIGS. 7-10 as performing the example flows. However, various components of the service provider computers 430 may be configured to perform some or all of the operations and other components or combination of components can be used and should be apparent to those skilled in the art.

Further, the example flows of FIGS. 7-10 may be embodied in, and fully or partially automated by, code modules executed by one or more processor devices of the service provider computers 430. The code modules may be stored on any type of non-transitory computer-readable medium or computer storage device, such as hard drives, solid state memory, optical disc or other non-transitory medium. The results of the operations may be stored, persistently or otherwise, in any type of non-transitory computer storage such as, e.g., volatile or non-volatile storage. Also, while the flows are illustrated in a particular order, it should be understood that no particular order is necessary and that one or more operations or parts of the flows may be omitted, skipped, or reordered. Additionally, one of ordinary skill in the art will appreciate that a computing device of a user, such as the computing devices 412 and 462 of the merchants 410 and consumers 460, may perform corresponding operations to provide information to and allow interaction with the user.

Figure 7:
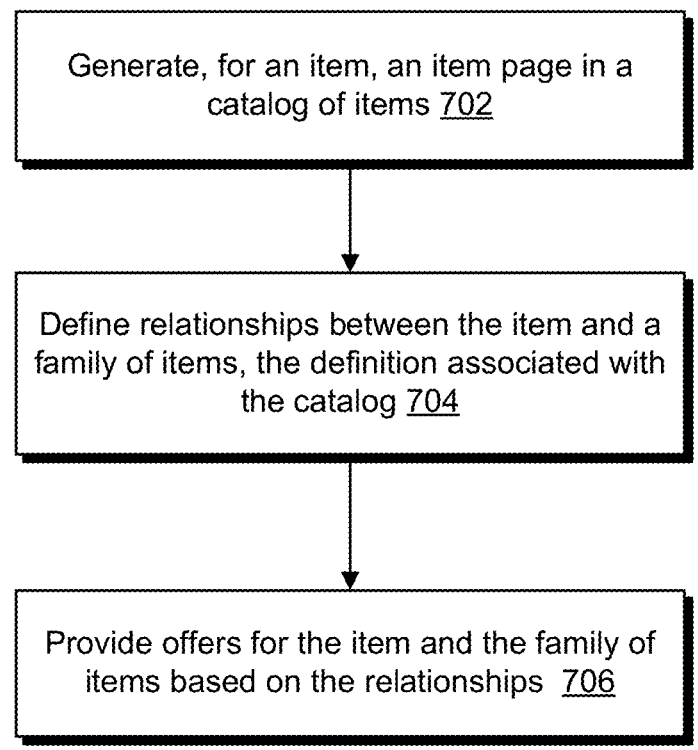
FIG. 7 illustrates an example flow for offering items, according to embodiments.
Figure 9:
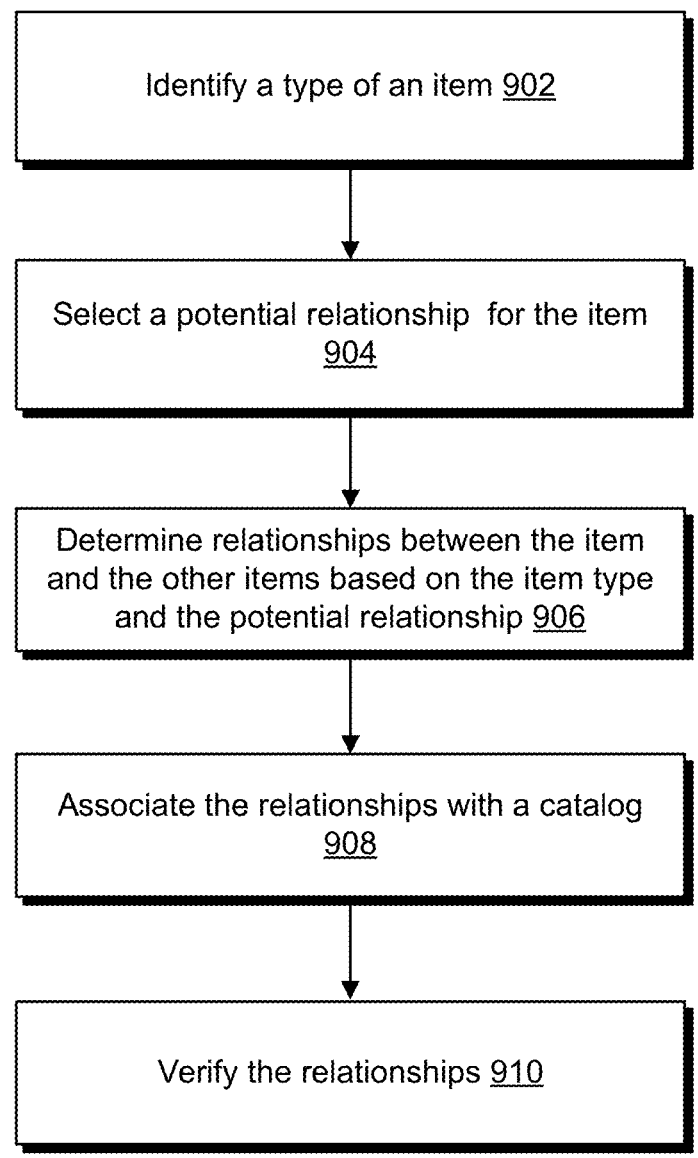
FIG. 9 illustrates an example flow for defining relationships between items, according to embodiments.
Figure 10:
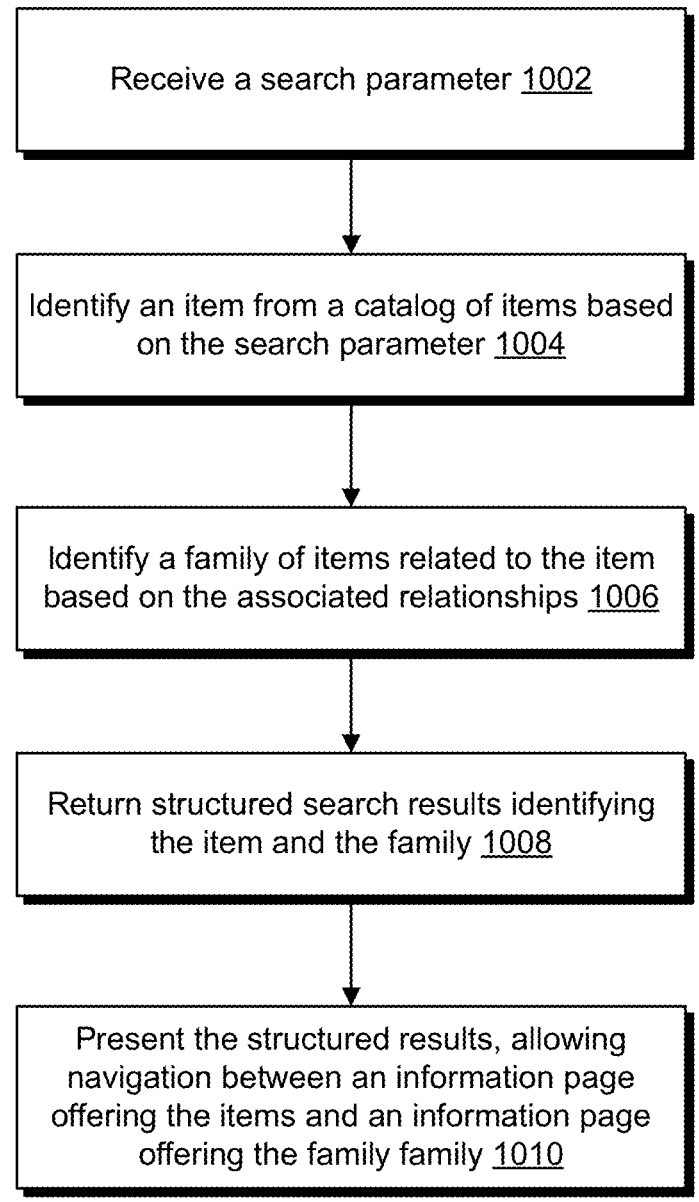
FIG. 10 illustrates an example flow for displaying offers, according to embodiments.

FIG. 7 illustrates an example flow that the catalog service may implement for cataloging and offering items and families of items. Operations of the example flow of FIG. 7 may be further embodied in operations of example flows of FIGS. 8-10. Thus, some operations of the example flows of FIGS. 8-10 may be similar. Such similarities may not be repeated herein in the interest of clarity of explanation. FIG. 8 illustrates a more detailed example flow for generating catalog pages that may include relationship fields. In comparison, FIG. 9 illustrates a more detailed example flow for defining relationships between items. FIG. 10 illustrates a more detailed example flow for offering items and families of items based on the associated relationships.

Turning to FIG. 7, that figure illustrates an example flow for cataloging items, families of items, and relationships and for offering the items and families of items based on the relationships. Generally, a service provider may implement the example flow of FIG. 7 to allow merchants to offer items and families of items at an electronic marketplace and to allow consumers to search for and browse offers for the items and the families of items. More particularly, the service provider may use the catalog service to catalog the items, the families of items, and the associated relationships. To do so, the catalog service may use a same catalog or separate but cross-referenced catalogs as explained herein above. In the interest of clarity of explanation, the example flow of FIG. 7 and the example flows of FIGS. 8-10 illustrate using a same catalog of items for cataloging the items, families of items, and relationships. However, the example flows similarly apply when also using a catalog of relationships.

The example flow of FIG. 7 may start at operation 702, where the catalog service may generate, for an item, an item page in a catalog of items. In an example, the catalog service may provide an interface and may receive, by way of the interface, input entered at a computing device of a user, such as the service provider or a merchant, to generate the item page. Additionally or alternatively, the catalog service may analyze data available at the electronic marketplace and/or another external resource (e.g., a web site of a manufacturer of the item) to generate the item page. The catalog of items may include other item pages for other items and may include family pages for families of items. Operation 702 may embody some or all of the operations of the example flow of FIG. 8.

At operation 704, the catalog service may define relationships between the item and a family of items, where the definition may be associated with the catalog of items. In an example, the catalog service may determine the relationships based on user input provided by way of the interface and/or based on analyzing the data available at the electronic marketplace and/or the external resource. Further, the catalog service may extend the item page of the item, the family page of the family, and/or item pages of other items in the family to include several fields, such as relationship type and related item fields, for capturing the relationships. The catalog service may populate these fields accordingly to define the relationships. Operation 704 may embody some or all of the operations of the example flow of FIG. 9.

At operation 706, the catalog service may provide offers for the item and for the family of items based on the relationships. In an example, the catalog service may interface with a search engine of the electronic marketplace to return descriptions of the item and the family of items from the catalog in response to a search for the item. The catalog service may allow the search engine to not only find the item page, but to also find the family page and the item pages of the other items in the family based on the populated fields in those pages, including the relationship type and related item fields. The returned descriptions may be provided in one or more web pages. The one or more web pages may include rendering instructions such that, when rendered at a computing device, the one or more web pages may present offers about the item, the family, and the related items. Operation 706 may embody some or all of the operations of the example flow of FIG. 9.

Turning to FIG. 8, that figure illustrates an example flow for generating a catalog page. As explained herein above, a catalog page may include an item page for an item or a family page for a family of items. As such, the example flow of FIG. 8 may similarly apply to generating an item page and to generating a family page.

The example flow of FIG. 8 may start at operation 802, where the catalog service may provide an interface for defining a catalog page. The interface may be provided to a computing device of a user, such as the service provider or a merchant. The interface may include various fields, some of which may allow an input in free form (e.g., a free text input) and some of which may allow a selection of an input from a predefined number of inputs (e.g., a drop-down list of selections). The various fields may allow the user to define, for an item or for a family of items, a title, a unique identifier if available, attributes of the item or the family, and/or attributes of offering the item or the family.

At operation 804, the catalog service may receive a description of the item or the family of items. In example, the description may be received by way of the interface, such as input of the user entered in the various fields. As such, the catalog service may allow the user to define the title, the unique identifier if available, the attributes of the item or the family, and the attributes of offering the item or the family. In another example, the catalog service may supplement or verify the received descriptions using a combination of various techniques. In one technique, if one user (e.g., the merchant) provides the description, the catalogs service may allow another user (e.g., the service provider) to edit the description by way of the interface. In another technique, the catalog service may allow multiple merchants to use the interface to input the description. In this case, the service provider may configure the catalog service to aggregate the various inputs to generate the description and to flag potential mismatches or conflicts between the inputs. The catalog service may allow the service provider to correct the mismatches or conflicts by way of the interface. In a further technique, the catalog service may allow the service provider to identify a trusted merchant. In turn, the catalog service may provide the interface to and receive the description from the trusted merchant or may use input from the trusted merchant to correct mismatches or conflicts. In yet another technique, the catalog service may interact with an external resource, such as a web site of a manufacturer, to receive, verify, or supplement the description. This interaction may include using, for example, a web crawling process.

At operation 806, the catalog service may generate the catalog page based on the description. For example, the catalog service may generate a template or shell catalog page and may populate such a page with the description to generate the catalog page. As such, fields in the catalog page may be populated with corresponding information from the description.

At operation 808, the catalog service may associate the catalog page with a catalog of items. For example, the catalog service may add the catalog page to the catalog items. Further, the catalog service may reference the added catalog page in a catalog of relationships.

Turning to FIG. 9, that figure illustrates an example flow for determining and cataloging relationships between items. As explained herein, related items may belong to a same family of items and several types of relationships may exist between the items and between the items and the family. As such, a relationship may be defined by identifying the related items and/or the family and the associated relationship types. The definition may be captured in fields of some or all of the catalog pages corresponding to the items and the family. Additionally or alternatively, the definition may be captured in a catalog of relationships.

The example flow of FIG. 9 may start at operation 902, where the catalog service may identify a type of an item. For example, the catalog service may analyze the corresponding item page to identify the item type. The item page may include a field specific to the item type, which as described herein above may be populated based on input from users or based on a description received from an external source. Additionally or alternatively, the item page may include a description of the item such as technical specification and other attributes that the catalog service may analyze to generate the item type. Generally, the item type may reflect a category of items that the item may belong to, such as consumer electronics, home products, services, medicine, nutritional items, or other categories.

At operation 904, the catalog service may select a potential relationship for the item. As explained herein above, various relationships may exist, such as bundled, generic, universal part, replacement part, or other relationships. Based on the type of the item, one or more relationships may apply. For example, for a consumer electronic (e.g., a camera), a bundled relationship may be available. Similarly, for another consumer electronic (e.g., a cell phone power charger), a generic relationship or a replacement part relationship may be available. In another example, for a prescription drug, a generic relationship may be available. As such, based on the item type, the catalog service may select a potential relationship.

At operation 906, the catalog service may determine relationships between the item and other items based on the item type and the potential relationship. In other words, the catalog service may determine what items may be related to the item and what relationships between the items may exists. To do so, the catalog service may use a combination of techniques. In one technique, the catalog service may provide an interface to a computing device of a user, such as the service provider or a merchant. The interface may allow the user to define a catalog page for the item or for a family that may contain the item, as illustrated in the example flow of FIG. 8. Also, the interface may include a field(s) for identifying the related items and a field(s) for identifying the relationship types. These fields may be pre-populated with the potential relationship from operation 904. In this technique, the catalog service may further configure the interface to allow one user (e.g., the service provider) to verify the input entered by the other user (e.g., the merchant).

In another technique, the catalog service may implement an automated process that may supplement or replace the input of the user(s). In this technique, the catalog service may apply a multi-step process. In a first step, the catalog service may consider, based on the item type, potential items that may be compared to determine the related items. For example, if the item type is a certain consumer electronic (e.g., a camera), the catalog service may consider other consumer electronics in a same or a related category (e.g., other cameras, camera accessories, or other camera-related items). In this example, the catalog service need not consider prescription drug items because such items may be irrelevant to consumer electronics. In a second step, the catalog service may select a source of data associated with the potential items. The source may be an internal and/or an external resource of the electronic marketplace and may include, for example, descriptions of the potential items. An example of an internal resource may include existing catalog pages, usage history of consumers, and other resources. An example external resource may include a web site of a manufacturer of the item. In a third step, the catalog service may set, based on the item and the potential relationship, a number of parameters that may be used to analyze the data from the source. The analysis may compare the parameters to parameters of the potential items. Detected matches between the parameters may indicate a related item. For example, for a prescription drug, the catalog service may set a chemical composition and/or directions of use of the drug as the parameters and may compare these parameters to descriptions of other prescription drugs. When a match with another drug is found, the catalog service may determine that the other prescription drug may be related. In another example, for a camera, the catalog service may set technical attributes of the camera as the parameters. If the potential relationship is a bundled relationship, the technical attributes may include compatible items. In comparison, if the potential relationship is a replacement part, the technical attributes may include attributes of a system that may install the camera and/or attributes to an interface to the system. In turn, the catalog service may analyze data from the source to determine matches. In a fourth step, the catalog service may determine, based on the matched item and the potential relationship, a relationship type. To illustrate, and considering the previous example of a potential generic relationship, if unlike the related prescription drug, the description of the prescription drug does not include a unique identifier, the catalog service may set the related prescription drug as a parent item and the prescription drug as a member item. Similarly, if a related item for a camera is a memory card and the potential relationship is a bundle, the catalog service may set the camera as the parent item and the memory card as a member item.

In yet another technique, the catalog service may analyze usage history of consumers to determine the relationships. For example, the catalog service or some component of the electronic marketplace may track data indicative of usages of the consumers in association with the electronic marketplace. This data may include, among other things, identifiers of items that consumers may in conjunction add to a shopping cart and sequences of adding such items to the shopping cart. The catalog service may apply machine learning or pattern recognition algorithms to determine the relationships between the items based on the data. For instance, if consumers tend to add two items together to a shopping cart at a frequency that may exceed a threshold (e.g., 90% of the time, the two items may be added), the catalog service may determine that the two items may be related. Similarly, if one of the two item is added first to the shopping cart at another frequency that may exceed another threshold (e.g., 80% of the time, that item may be added first), the catalog service may determine that the first added item may be a parent item and the other item may be a member item.

At operation 908, the catalog service may associate the relationships with a catalog. For example, the catalog service may update catalog pages with identifiers of the related items and relationship types determined at operation 906. The updated catalog pages may include one or more of item pages and family pages corresponding to the item, the related items, and families containing the item. In another example, the catalog service may update a catalog of relationships with the identifiers of the related items and the relationship types and may reference the catalog of relationships with the corresponding catalog pages.

At operation 910, the catalog service may verify the relationships. Generally, verifying the relationships may include confirming that the determined relationships at operation 906 may be proper or valid. To do so, the catalog service may implement a combination of various techniques. In one technique, the catalog service may request the user to verify the relationships by way of the interface. For example, the interface may present fields identifying the related items and the relationship types and may allow the service provider to edit these fields. In another technique, the catalog service may request another user to verify the relationships. For example, if the merchant defined the relationships at operation 906, the catalog service may request the service provider to confirm or edit the defined relationships by way of the interface.

In yet another technique, the catalog service may use an automated process that may supplement or replace user input. For example, the catalog service may monitor over time an uptake rate of the item before and after the relationships may have been determined. The uptake rate may relate to how often a consumer browses, searches, or conducts a transaction that may involve the item. For example, an uptake rate for a particular camera may be one thousand clicks per minute, or some other number, on a web page offering the particular camera. If the uptake rate increases after setting-up the relationships and allowing consumers to browse for the item based also on the relationship, the increase may indicate that the relationships may be proper. Otherwise, because no additional consumer traffic may have been generated based on the relationships, the relationships may be improper.

In a further technique, the catalog service may or some other component of the electronic marketplace may track data associated with consumer complains. The catalog service may analyze the data to determine whether consumers may be complaining because a relationship is improper. For example, if a consumer complaint includes a statement describing that the generic prescription drug is not a generic version of an original prescription drug, the catalog service may determine that the generic relationship between the two drugs may be improper. Further, the catalog service may analyze the consumer complaints over time. If, after defining a relationship, the number of complaints increases and exceeds a certain threshold, the catalog service may determine that the relationship may be improper. Regardless of the implemented technique or combination of techniques, if a relationship is determined to be improper, the catalog service may remove the relationship by, for example, deleting the values from related item and relationship type fields in the corresponding catalog pages.

Turning to FIG. 10, that figure illustrates an example flow for offering items and families of items based on associated relationships. The service provider may configure the catalog service to implement the example flow of FIG. 10 such that consumers may search the electronic marketplace for an item and, in response, may view and compare offers for the item and for families of items.

The example flow of FIG. 10 may start at operation 1002, where the catalog service may receive a search parameter. For the example, the catalog service may interface with a search engine that may have received a search parameter entered by a consumer at a computing device in communication with the electronic marketplace. The search parameter may include a description of an item, such as a unique identifier, a title, or an attribute of the item.

At operation 1004, the catalog service may identify an item from a catalog of items based on the search parameter. For example, the catalog service may compare the search parameter to descriptions of items in item pages and may determine the item based on corresponding matches.

At operation 1006, the catalog service may identify a family of items related to the item based on associated relationships. For example, the catalog service may determine from the item page of the item what related items and families of items may exist and the associated relationship types. In another example, the catalog service may determine, using the search parameter, a match to a family page of a family of items. Based on the matched family page, the catalog service may identify the related items and the associated relationship types. In yet another example, the catalog service may query a catalog of relationships to identify the family of items.

At operation 1008, the catalog service may return a structured result identifying the item and the family of items. The structured result may be presented a user interface where, for example, a first field summarizing offers about the item may be presented and a second separate field summarizing offers about the family may also be presented. The catalog service may determine the offers based on the corresponding item page and family page and may include the associated summaries and details about each offer in the structured result.

At operation 1010, the catalog service may support a presentation of the structured results. For example, the catalog service may generate web pages describing the summaries and the details about the offers for the item and the offers for the family. A web page may include rendering instructions for presenting the associated information at the computing device of the consumer and may also reference the other web pages. As such, when rendered, the web page may allow the consumer to view certain information related to offering the item or the family of items and to navigate to the other web pages.

Figure 11:
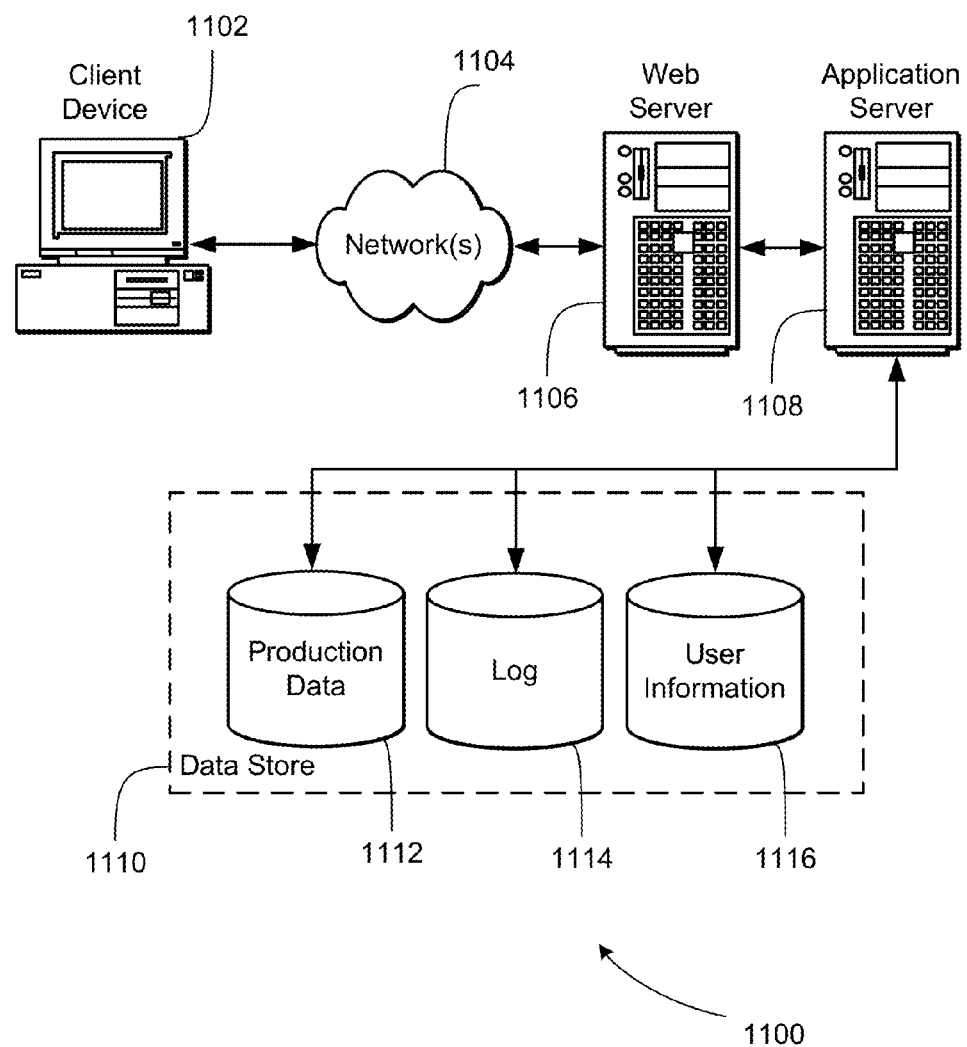
FIG. 11 illustrates an environment in which various embodiments can be implemented.

Turning to FIG. 11, that figure illustrates aspects of an example environment 1100 capable of implementing the above-described structures and functions. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network(s) 1104 and convey information back to a user of the device. Examples of such client devices include personal computers, cell phones, handheld messaging devices, laptop computers, set-top boxes, personal data assistants, electronic book readers, or any other computing device. The network(s) 1104 can include any appropriate network, including an intranet, the Internet, a cellular network, a local area network or any other such network or combination thereof. Components used for such a system can depend at least in part upon the type of network or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 1102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of environment 1100 in FIG. 11 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, or removable storage devices as well as storage media for temporarily or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    determining, by a computer system associated with an electronic marketplace, a relationship between a parent item and a member item offered at the electronic marketplace, the relationship describing a relationship type between the parent item and the member item, the parent item associated with a first data structure that describes the parent item, the member item associated with a second data structure that describes the member item, and the relationship determined by at least:
        identifying an item type of the member item based at least in part on the second data structure,
        analyzing, based at least in part on the item type, the first data structure and the second data structure to determine a match between the first data structure and the second data structure, and
        identifying the relationship type based at least in part on the match between the first data structure and the second data structure;
    updating, by the computer system, a data model comprising the first data structure and the second data structure by at least updating the first data structure and the second data structure based at least in part on the relationship, the first data structure updated to also describe the relationship type with the member item and to identify the second data structure, the second data structure updated to describe the relationship type with the parent item and to identify the first data structure;
    receiving a search request associated with the parent item;
    identifying the parent item based at least in part on a match between the search request and a description of the parent item from the first data structure;
    identifying, from the first data structure, the member item based at least in part on a description of the relationship type with the parent item in the first data structure;
    identifying, from the second data structure, a description of the member item based at least in part on an identifier of the second data structure in the first data structure;
    providing a search result based at least in part on the data model, the search result identifying the parent item in a first field and identifying the member item in a second field; and
    at least in response to receiving a selection of the second field, providing the description of the member item from the second data structure and a description of the relationship type with the parent item from the second data structure.

2. The computer-implemented method of claim 1, wherein the parent item and the member item are offered by an item provider, and wherein determining the relationship between the parent item and the member item comprises:
    providing an interface to a computing device of the item provider, the interface requesting a definition of the relationship;
    receiving an input defining the relationship by way of the interface; and
    storing the relationship in a field of the second data structure describing the member item.

3. The computer-implemented method of claim 1, wherein the member item comprises at least a plurality of item bundles, a particular bundle of the plurality of item bundles including at least the parent item.

4. The computer-implemented method of claim 1, wherein determining the relationship between the parent item and the member item further comprises selecting a parameter based at least in part on the item type of the member item, and wherein the match between the first data structure and the second data structure is determined based at least in part on the parameter.

5. The computer-implemented method of claim 4, wherein the item type indicates that the member item combines a plurality of items comprising the parent item into a bundle, wherein the parameter comprises an identifier, and wherein the match between the first data structure and the second data structure indicates that the first data structure and the second data structure comprise the identifier.

6. The computer-implemented method of claim 5, wherein the identifier comprises at least one of a universal product code (UPC), a unique identification number, a title, or an attribute of the parent item.

7. The computer-implemented method of claim 4, wherein the item type indicates that the member item comprises a generic version of the parent item, wherein the parameter comprises an attribute of the parent item, and wherein the match between the first data structure and the second data structure indicates that the first data structure and the second data structure comprise the attribute.

8. The computer-implemented method of claim 4, wherein the item type indicates that the member item comprises a replacement part for a portion of the parent item, wherein the parameter comprises a description of the portion of the parent item, and wherein the description determines the match between the first data structure and the second data structure.

9. The computer-implemented method of claim 1, further comprising generating a first network document based at least in part on the first data structure and a second network document based at least in part on the second data structure, wherein determining the relationship between the parent item and the member item comprises:
- tracking a usage history of item recipients, the usage history associated with browsing the first network document and the second network document at the electronic marketplace;
- determining, based at least in part on the usage history, that the second network document is browsed sequentially after the first network document at a frequency that exceeds a threshold; and
- setting the relationship type as a family relationship, wherein the parent item is a parent item and the member item is a member item.

10. A system, comprising:
a memory that stores computer-executable instructions; and
a processor configured to access the memory and to execute the computer-executable instructions to collectively at least:
- generate a data model for describing a plurality of items and relationships between the plurality of items, the data model comprising a first data structure corresponding to a parent item of the plurality of items, the data model comprising a second data structure corresponding to a member item of the plurality of items, the first data structure describing the parent item and the relationship type with the member item and identifying the second data structure, the second data structure describing the member item and the relationship type with the parent item and identifying the first data structure, the data model generated by at least:
  - identifying an item type of the member item based at least in part on the second data structure,
  - analyzing, based at least in part on the item type, the first data structure and the second data structure to determine a match between the first data structure and the second data structure,
  - identifying the relationship type based at least in part on the match between the first data structure and the second data structure, and
  - adding one or more descriptions of the relationship type to the first data structure and the second data structure;
- receive a first request for information about the parent item;
- identify the parent item based at least in part on a match between the first request and a description of the parent item from the first data structure;
- identify, from the first data structure, the member item based at least in part on a description of the relationship type with the parent item in the first data structure;
- identify, from the second data structure, a description of the member item based at least in part on an identifier of the second data structure in the first data structure;
- respond to the first request with a first identification of the parent item and a second identification of the member item based at least in part on the data model;
- receive a second request for information about the member item; and
- respond to the second request with the description of the member item from the second data structure and a description of the relationship with the parent item from the second data structure.

11. The system of claim 10, wherein the computer-executable instructions, when executed with the processor, further cause the system to collectively at least:
- track a metric associated with providing the member item to item recipients based at least in part on the relationship between the parent item and the member item; and
- validate the relationship based at least in part on the metric.

12. The system of claim 11, wherein the metric is associated with complaints received from computing devices of the item recipients, and wherein validating the relationship comprises:
- determining that a number of the complaints exceeds a threshold and indicates that the relationship is invalid;
- updating the relationship to indicate that the relationship is invalid; and
- updating the data model to disassociate the parent item and the member item based at least in part on the updated relationship.

13. The system of claim 11, wherein the computer-executable instructions, when executed with the processor, further cause the system to collectively at least:
- generating a first web page based at least in part on the first data structure and a second web page based at least in part on the second data structure, wherein the metric is associated with a rate of browsing the second web page based at least in part on the relationship between the parent item and the member item, and
wherein validating the relationship comprises:
- monitoring a change to the rate over time;
- determining that the relationship is valid if the rate increases; and
- determining that the relationship is invalid if the rate remains the same or decreases.

14. The system of claim 10, wherein the second data structure identifies that the parent item is a parent to the member item.

15. The system of claim 14, wherein the first data structure identifies that the parent item is the parent to the member item, and wherein the computer-executable instructions, when executed with the processor, further cause the system to collectively at least declare the relationship to be invalid if a first identification of the parent item or a second identification of the member item is inconsistent between the first data structure and the second data structure.

16. The system of claim 14, wherein the second data structure identifies a third item and an exclusivity relationship with the third item, wherein the third item is related to the parent item, and wherein the exclusivity relationship indicates that the member item cannot be offered with the third item in conjunction with offering the member item with the parent item.

17. One or more non-transitory computer-readable storage media storing computer-executable instructions that, when executed by one or more computer systems, configure the one or more computer systems to perform operations comprising:
- generating a data model associated with a parent item and a member item, the data model comprising a first data structure corresponding to the parent item and a second data structure corresponding to the member item, the first data structure describing the parent item and the relationship type with the member item and identifying the second data structure, the second data structure describing the member item and the relationship type with the parent item and identifying the first data structure, the data model generated by at least:
identifying an item type of the member item based at least in part on the second data structure,
analyzing, based at least in part on the item type, the first data structure and the second data structure to determine a match between the first data structure and the second data structure,
identifying the relationship type based at least in part on the match between the first data structure and the second data structure, and
adding one or more descriptions of the relationship type to the first data structure and the second data structure;
receiving a request for information about the parent item;
identifying the parent item based at least in part on a match between the first request and a description of the parent item from the first data structure;
identifying, from the first data structure, the member item based at least in part on a description of the relationship type with the parent item in the first data structure;
identifying, from the second data structure, a description of the member item based at least in part on an identifier of the second data structure in the first data structure; and
responding to the request with a first identification of the parent item and a second identification of the member item based at least in part on the data structure, the responding to the request comprising providing an interface for displaying the first identification and the second identification and for displaying data associated with the member item, the data comprising a first cost of the member item based at least in part on the relationship, and wherein the interface is further configured to display a second cost of the member item independent of the relationship.

18. The one or more computer-readable storage media of claim 17, wherein responding to the request comprises providing a list identifying the parent item in a first field and identifying the relationship between the parent item and the member item in a second field, wherein a selection of the second field indicates a second request for information about the member item.

19. The one or more computer-readable storage media of claim 17, wherein the data associated with the member item comprises a description of the relationship with the parent item from the second data structure.

20. The one or more computer-readable storage media of claim 17, wherein the interface is further configured to display a third cost of the parent item based at least in part on the relationship and, wherein the interface is further configured to display a fourth cost of the parent item independent of the relationship.

21. The one or more computer-readable storage media of claim 17, the interface is configured to display a first page generated from the first data structure, and wherein the interface is further configured to display a navigation field for navigating to the first page.

22. The computer-implemented method of claim 1, wherein the data model comprises a catalog of items, wherein the first data structure comprises a first page describing the parent item, and wherein the second data structure comprises a second page describing the member item.

* * * * *